United States Patent [19]

Andriulis

[11] 4,054,401
[45] Oct. 18, 1977

[54] VACUUM PUMP WITH LUBRICANT CONTROL SYSTEM TO INTERRUPT LUBRICANT FLOW UPON LOSS OF PUMP PRESSURE

[75] Inventor: Vytautas Andriulis, Chicago, Ill.

[73] Assignee: Central Scientific Company, Inc., Chicago, Ill.

[21] Appl. No.: 649,819

[22] Filed: Jan. 16, 1976

[51] Int. Cl.$^2$ .................. F01C 21/04; F04C 15/04; F04C 29/02

[52] U.S. Cl. .................. 418/84; 418/87; 184/6.16; 417/228

[58] Field of Search .................. 418/84, 87, 93, 96, 418/97, 98, 99; 184/6.16, 31, 76; 251/61.5; 417/228

[56] References Cited

U.S. PATENT DOCUMENTS

| 1,031,214 | 7/1912 | Wadsworth | 251/61.5 |
|---|---|---|---|
| 1,346,165 | 7/1920 | Berrenberg | 418/96 |
| 2,285,426 | 6/1942 | Freeman | 184/6.16 |
| 2,705,123 | 3/1955 | Hieger | 251/61.5 |
| 2,762,349 | 9/1956 | Malcolm | 184/6.16 |
| 3,243,103 | 3/1966 | Bellmer | 417/228 |
| 3,649,140 | 3/1972 | Harlin | 418/87 |
| 3,707,339 | 12/1972 | Budgen | 418/84 |

FOREIGN PATENT DOCUMENTS

| 1,179,666 | 10/1964 | Germany | 418/87 |

Primary Examiner—Carlton R. Croyle
Assistant Examiner—Thomas I. Ross
Attorney, Agent, or Firm—Haight, Hofeldt, Davis & Jambor

[57] ABSTRACT

A vacuum pump, having a pumping chamber with intake and exhaust ports communicating therewith, is provided with an arrangement to insert a liquid lubricant into the pumping chamber. A sensing device is utilized to detect the pressure at the exhaust port, the sensing device permitting operation of a deactivating unit when the pressure at the exhaust port falls below a predetermined value, pressure below the predetermined value being indicative of improper pumping action in the pump. The deactivating unit acts to render inoperative the lubricant introducing arrangement when the sensing device detects a pressure at the exhaust port below the predetermined value, thus precluding the insertion of lubricant into the pumping chamber upon the occurrence of defective pumping action in the vacuum pump.

10 Claims, 6 Drawing Figures

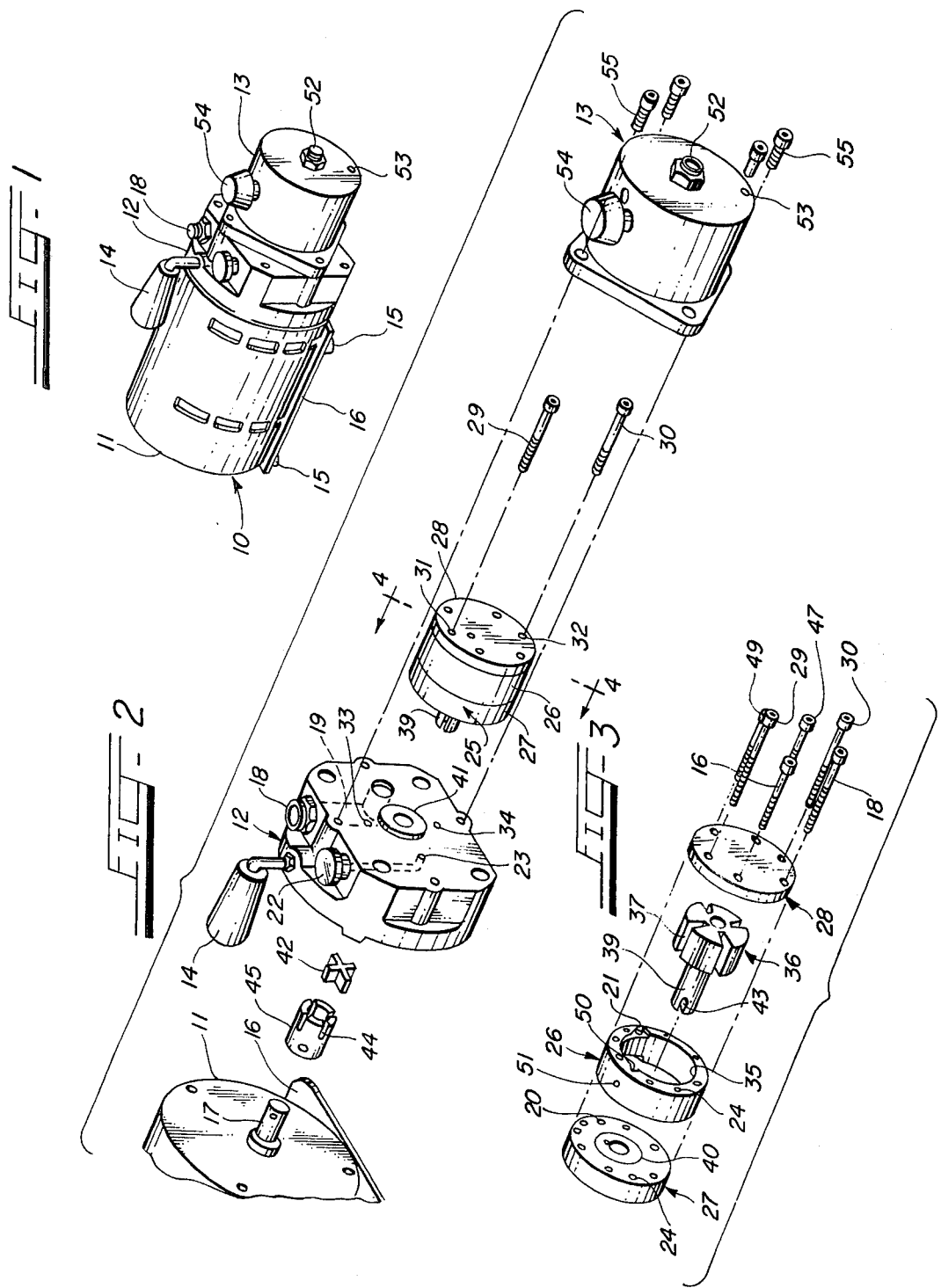

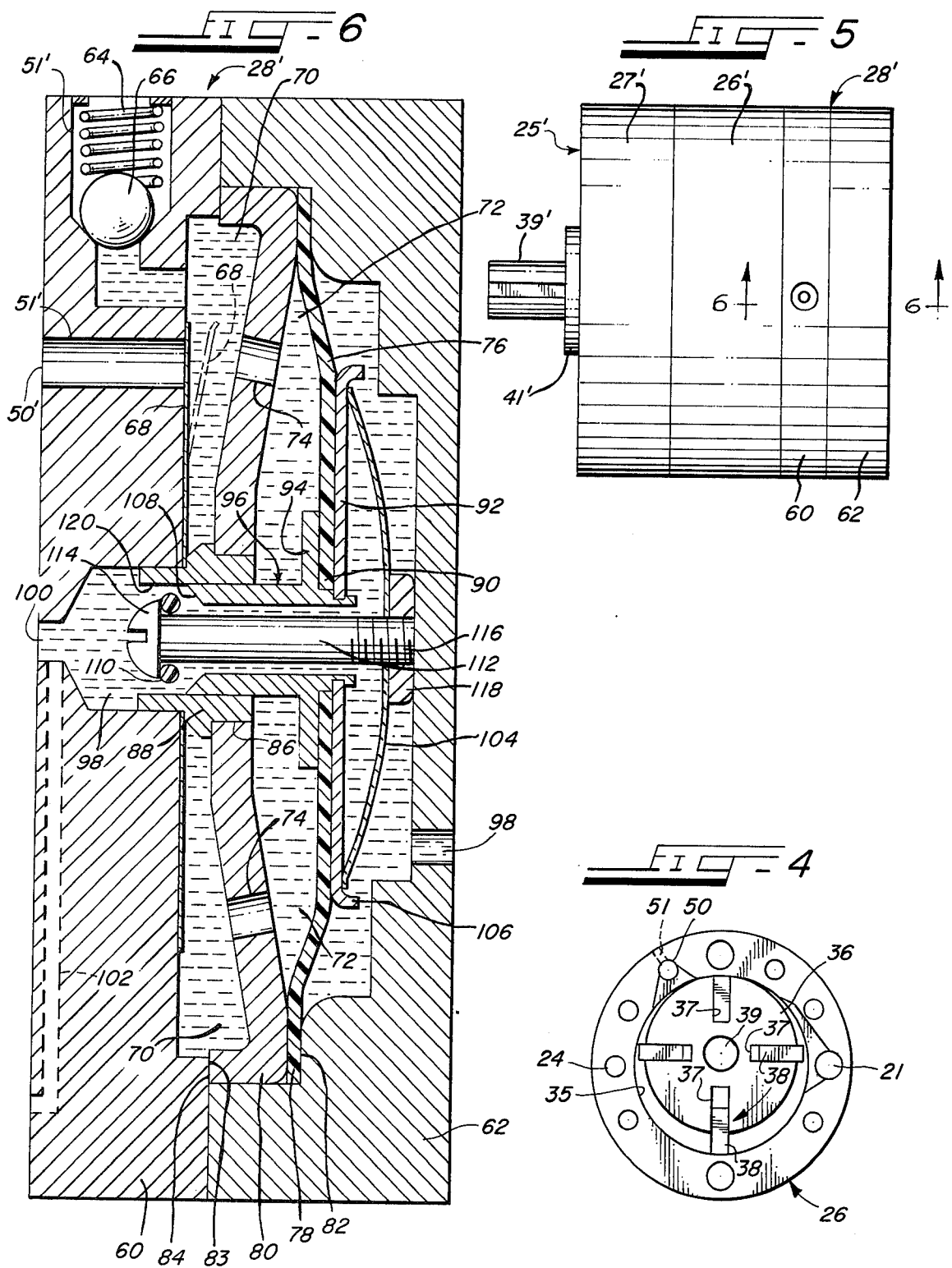

VACUUM PUMP WITH LUBRICANT CONTROL SYSTEM TO INTERRUPT LUBRICANT FLOW UPON LOSS OF PUMP PRESSURE

BACKGROUND OF THE INVENTION

1. Field of the Invention

This invention relates generally to a vacuum pump having a system for controlling the introduction of liquid lubricant into the pumping chamber of the vacuum pump, and more specifically, this invention relates to a control system for precluding the insertion of lubricant into the pumping chamber of a vacuum pump in response to the pressure at the exhaust port of the pump falling below a predetermined level indicative of improper pumping action.

2. Description of the Prior Art

Although the vacuum pumps toward which this invention is directed may be occasionally used as pressure pumps or compressors, their primary usefulness is in the evacuation of vessels, chambers, cavities, etc., in which a very low pressure (high vacuum) is required. In such vacuum pumps, a liquid lubricant, such as oil, is inserted into the pumping chamber. One type of such liquid lubricant insertion arrangement employs a bath of the lubricant in which the stator assembly of the pump is partially immersed, with a lubricant introducing conduit running from the bath to the pumping chamber. Another type of lubricant inserting arrangement employs an oil pump, driven by the same motor shaft that drives the rotor of the vacuum pump, to insert oil into the pumping chamber.

During operation of the pump, the small amount of lubricant inserted into the pumping chamber is exhausted with the gases being expelled through the exhaust port, as a result of the pumping action of the rotor in the pumping chamber, which results in a pressure being developed at the exhaust port. If, for some reason, the pumping action in the pumping chamber is deficient, the pressure at the exhaust port will decrease. Therefore, as a result of the decreased efficiency of the pumping action, the oil being introduced into the pumping chamber will tend to accumulate, since it is not being properly expelled. Similarly, at least in the case where an oil bath is employed, merely stopping operation of the pump will result in an accumulation of lubricant in the pumping chamber. Although various disconnect arrangements are frequently employed between the vacuum pump and the chamber being evacuated, these disconnect devices frequently do not suffice to prevent the accumulated lubricant from being sucked back into the cavity being evacuated, thus contaminating the cavity. Therefore, there exists a real need for a control arrangement that precludes the accumulation of lubricant in the pumping chamber.

As a result of being driven by the motor shaft that drives the rotor of the vacuum pump, an oil insertion pump has a built-in control of lubricant insertion upon deactivation of the motor. However, there may still be some accumulation of oil in the pumping chamber during the period when the rotation of the motor shaft is slowing down, since there will still be some pumping of lubricant into the pumping chamber, but the pumping action may not be sufficiently vigorous to expel all of the lubricant. Further, in other types of pump failure when the motor shaft continues to rotate, at least for a time, after a decrease in the pumping action, oil will accumulate in the pumping chamber of a vacuum pump having an oil insertion pump, with the attendant contamination of the cavity being evacuated.

SUMMARY OF THE INVENTION

With the present invention, the problems of oil contamination of the cavity being evacuated that occur with prior art devices may be obviated. This is accomplished by utilizing a pressure sensitive device to determine the pressure at the exhaust port and preclude the insertion of lubricant when that pressure falls below a predetermined value indicative of improper pumping action.

A vacuum pump has a pumping chamber in a stator assembly, the stator assembly including a conventional stator and appropriate end plates. Intake and exhaust ports open into the pumping chamber, and a rotor is rotated in the pumping chamber to provide the desired pumping action. In the preferred embodiment of the invention disclosed herein, the exhaust port is located in one of the end plates, which is termed the exhaust end plate for ease of reference. The exhaust port includes a conventional check valve, and the exhaust end plate may be either a single member or, as in the preferred embodiment disclosed herein, a double member.

A lubricant inserting arrangement, such as a conduit extending through the exhaust end plate from an oil bath to the pumping chamber, is utilized to insert a liquid lubricant, such as oil, into the pumping chamber. During rotation of the rotor, the resulting pumping action draws gases into the pumping chamber through the intake port and expels gases and lubricant through the exhaust port to produce a pressure at the exhaust port which may be detected by an appropriate pressure sensing device, such as a flexible or elastomeric diaphragm. A deactivating unit, such as a bias spring acting on a reciprocable plunger, the bias spring producing a force on the plunger in opposition to the force on the plunger produced by the diaphragm in response to the pressure at the exhaust port, may be utilized to render the lubricant inserting arrangement inoperative when the pressure at the exhaust port falls below a predetermined value, thus indicating improper pumping action. The plunger is used to deactivate the oil insertion arrangement when the force of the bias spring overcomes the force of the sensing diaphragm. By the combined action of the diaphragm and the deactivating unit, the input of lubricant to the pumping chamber is prevented in the event of improper or inadequate pumping action, while yet permitting lubricant insertion if the pumping action is proper.

The remainder of the deactivating arrangement includes an elastomeric sealing member, such as an O-ring, positioned at the end of a stem. Actuation of the plunger by the bias spring causes a cam portion at one end of the plunger to bear against the sealing member to preclude the insertion of lubricant into the pumping chamber. The stem may be a screw or bolt having a head at one end, which positions the sealing member, and a nut at the other end, the bias spring engaging the nut to hold the stem in position. The stem is located in the oil insertion conduit with a space between the stem and the plunger and between the sealing member and the wall of the conduit, so that the lubricant can flow along the stem, over the sealing member and into the pumping chamber, unless the cam portion of the plunger is brought into engagement with the sealing member to close the lubricant inserting conduit.

With this arrangement, the elastomeric sensing diaphragm will hold the plunger away from the sealing member against the force of the bias spring, so long as the pressure at the exhaust port exceeds a predetermined value. When the pressure of the exhaust port falls below this predetermined value, the bias spring will actuate the plunger to engage the sealing member and preclude the insertion of lubricant into the pumping chamber of the vacuum pump, thus preventing contamination of the cavity being evacuated when the pumping action is deficient for any reason whatsoever.

These and other objects, advantages and features of this invention will hereinafter appear, and for purposes of illustrated, but not of limitation, an exemplary embodiment of the subject invention is shown in the appended drawing.

BRIEF DESCRIPTION OF THE DRAWING

FIG. 1 is a left front perspective view of a vacuum pump that may be utilized with the present invention.

FIG. 2 is an exploded view of the vacuum pump of FIG. 1.

FIG. 3 is an exploded view of a portion of FIG. 2.

FIG. 4 is a cross sectional view taken along lines 4—4 of FIG. 2.

FIG. 5 is a top plan view of a portion of the vacuum pump of FIG. 1, modified in accordance with the present invention.

FIG. 6 is a cross sectional view taken along lines 6—6 of FIG. 5.

DETAILED DESCRIPTION OF THE PREFERRED EMBODIMENT

While the present invention may be employed with any vacuum pump in which oil is introduced into a pumping chamber, the invention will be explained with particular reference to the vacuum pump 10 illustrated in FIGS. 1-4. Vacuum pump 10 includes a drive motor 11, a mounting plate 12 and a pump housing 13. A carrying handle 14 is connected to the mounting plate 12, and rubber feet or bumpers 15 are affixed to a frame 16 for supporting the vacuum pump when it is set down for operation or storage.

Motor 11 is in a conventional drive motor for a vacuum pump. A motor drive shaft 17 extends from motor 11 in order to drive the rotor of vacuum pump 10.

Mounting plate 12 has an inlet fitting 18, which communicates with an inlet conduit 19. Conduit 19 communicates with another conduit 20 (FIG. 3), which, in turn, leads to an intake port 21 (FIGS. 3 and 4). Gas ballasting is achieved by means of the knurled nut 22, which is connected to a threaded rod, and interconnecting conduits 23 and 24.

A pumping module 25 has a stator assembly including a stator 26 and end plates 27 and 28. The module 25 is connected to the mounting plate 12 by bolts 29 and 30, which extend through openings 31 and 32 in module 25 and are screwed into appropriate threaded openings 33 and 34 in mounting plate 12.

With reference to the exploded view of FIG. 3, the details of the pumping module 25 may be seen in greater detail. The stator assembly of stator 26 and end plates 27 and 28 encloses a pumping chamber 35, in which is located a rotor 36. Rotor 36 has vane slots 37, in which spring biased vanes 38 (FIG. 4) are located. As may be seen from FIG. 4, rotor 36 is eccentrically mounted in the pumping chamber 37, so that upon rotation of the rotor 36 an appropriate pumping action is achieved.

Rotor 36 is connected to a rotor shaft 39, which is mounted on a bearing 40 in end plate 27 and provided with a rotational seal 41 in mounting plate 12. Rotor shaft 39 is connected to motor shaft 17 by an elastomeric cross piece 42, which fits in cruciform slots 43 on the rotor shaft 39 and corresponding slots 44 in a connecting member 45, connecting member 45 being rigidly affixed to motor shaft 17. Bolts 46, 47, 48 and 49 connect stator 26 and end plates 27 and 28 together to form the pumping module 25. Bolts 29 and 30 then affix this module 25 to the mounting plate 12.

An exhaust port 50 communicates with the pumping chamber 35 and an exhaust conduit 51. An appropriate check valve of a conventional type is located in the exhaust conduit 51.

Housing 13 is a fluid tight enclosure in which a bath of liquid lubricant, such as oil, is located to partially immerse or surround the stator assembly formed by stator 26 and end plates 27 and 28. An oil level sight glass 52 is located in housing 13, while an oil drain tap 53 is formed near the lower portion of the housing to permit drainage of the oil in the housing. A pump discharge vent 54 is located at the top of the housing 13 to discharge pressure to the atmosphere. Housing 13 is affixed to mounting plate 12 by a plurality of bolts 55.

In operation, rotation of rotor 36 causes gas to be pulled or sucked from a cavity to be evacuated, which is connected to fitting 18, through the intake port 21. This gas, as well as any lubricating oil that has been inserted into the pumping chamber, is then expelled through exhaust port 50 and exhaust conduit 51 to the interior of housing 13. The expelled oil is then returned to the oil bath in housing 13, while the gas is vented to the atmosphere through the pump discharge vent 54. For a more complete description of pump 10, reference may be made to the copending application of Vytautas Andriulis entitled "MODULAR PUMP APPARATUS AND ASSEMBLY," U.S. Pat. application Ser. No. 394,092, filed on Sept. 4, 1973 and assigned to the same assignee as the present application.

With reference now to FIG. 5, a pumping module 25' modified in accordance with the present invention is illustrated. The stator assembly includes a stator 26' and end plates 27' and 28'. However, end plate 28', in this preferred embodiment, has two sections 60 and 62. In should be recognized, however, that the end plate 28' coulld be a single member. Further, the end plate 28' has been characterized as the exhaust end plate for purposes of distinguishing it from end plate 27', and in view of the fact that the exhaust function is being carried out through this end plate in the preferred embodiment disclosed herein. However, it should be recognized that this preferred embodiment is not the only form that the invention could take.

In the cross sectional view of FIG. 6, the details of the preferred embodiment of this invention are depicted. An exhaust port 50' is in communication with the pumping chamber. Expulsion of gases and lubricant from the pumping chamber is achieved through the exhaust port 50' and the exhaust conduit 51'. A check valve is located in the exhaust conduit 51', as represented by the spring 64 and ball seal 66. A leaf spring 68 also provides a type of check valve, as it moves to the open position shown in dotted lines when the pressure at the exhaust port 50' is sufficiently great to flex the leaf spring. However, the purpose of this leaf spring 68 is to prevent oil in portion 70 of conduit 51' from flowing back into the pumping chamber, since the pumping action of the vaned rotor produces a pulsating condition at exhaust port 50'. The pressure in portion 70 of exhaust conduit 51' is communicated to a chamber 72 via an opening 74. The pressure in chamber 72, in which the pressure at exhaust port 50', is applied to a flexible sensing diaphragm 76.

Diaphragm 76 is formed of an elastomeric material, such as rubber, and has the outer portion 78 thereof firmly stationed between a portion 80 of the end plate and a shoulder 82 on the section 62. Opening 74 is formed through the portion 80. Portion 80 has and end 83 thereof carried by a shoulder 84 in section 60 and the other end 86 thereof in engagement with a sleeve or bushing 88, which is also mounted on section 60.

An inner diameter portion 90 of flexible diaphragm 76 is firmly affixed between flanges 92 and 94 of a plunger 96. Plunger 96 is mounted for reciprocable motion in oil inserting conduit 98, which leads from the oil bath in housing 13 to the pumping chamber 35. For illustrative purposes, the oil inserting conduit 98 is shown as communicating with pumping chamber 35 at opening 100, although in actual practice this portion of the conduit would probably take the shape shown in dotted lines at 102.

Since the plunger 96 is in sliding contact with the sleeve 88, in the preferred embodiment shown herein, sleeve 88 is formed of bronze, although it could be formed of any other suitable material, such as the steel of the end plate.

A biasing arrangement, such as a suitable bias spring 104, engages the upturned ends 106 of flange 92 to urge the plunger 96 toward the left in the orientation of FIG. 6. As a result of this bias, it may be noted that the flange 92 need not be integral with the plunger 96, but may be separate therefrom, as it will be held in unitary juxtaposition with the other portions of plunger 96 by the force of spring 104.

The pressure in chamber 72 causes the flexible diaphragm 76 to exert a force against plunger 96 that opposes the force of the bias spring 104. Hence, so long as the pump is producing an appropriate pumping action, with the corresponding pressure at exhaust port 50', the plunger 96 will remain in the position shown in FIG. 6. However, if the pressure at exhaust port 50' falls below a predetermined value that is established by the force of the spring 104, the force exerted by the diaphragm 76 will not be sufficient to offset the spring force and plunger 96 will be moved to the left in the orientation of FIG. 6. As plunger 96 is moved to the left, a cam portion or end 108 thereof will engage a sealing member 110. Sealing member 110 is formed of an elastomeric material, and in this preferred embodiment may be a rubber O-ring. When cam portion 108 is brought into engagement with sealing member 110, the oil insertion conduit 98 is closed to prevent the insertion of lubricant into the pumping chamber.

Sealing member 110 is mounted adjacent one end of a stem 112, which is located in the lubricant inserting conduit 98. In this preferred embodiment, stem 112 may be a bolt or screw having a head 114 and a threaded portion 116. A nut 118 is threaded on portion 116 of stem 112. Bias spring 104 engages the nut 118 to hold the bolt or stem 112 in the position illustrated. Sealing member 110 is located on the head 114 of the bolt 112 and is spaced from the wall 120 of the lubricant inserting conduit 98, so that the oil may flow therebetween. Similarly, the stem 112 is spaced from the internal diameter of plunger 96, so that the oil may flow about spring 104, past stem 112 and around the sealing member 110, when the pump is pumping properly. As previously indicated, when the pumping action is insufficient, spring 104 and plunger 96 serve as a deactivation arrangement to render the oil insertion conduit 98 inoperative as a result of the sealing action achieved by cam portion 108 engaging the sealing member 110.

With the structure described herein, a system has been provided to preclude the insertion of lubricant into the pumping chamber of a vacuum pump when the pumping action has become deficient. This is achieved by sensing the pressure at the exhaust port, and deactivating the oil insertion arrangement when this pressure falls below a predetermined value indicative of proper pumping action.

It should be understood that various modifications, changes and variations may be made in the arrangements, operations and details of constructions of the elements disclosed herein without departing from the spirit and scope of this invention.

I claim:

1. A vacuum pump comprising:
   a stator assembly;
   a pumping chamber, having an intake port and an exhaust port in communication therewith, located in said stator assembly;
   a rotor in said pumping chamber being rotated to produce pumping action by drawing gases in said intake port and expelling gases and lubricant through said exhaust port;
   a reciprocable plunger mounted in said stator assembly;
   a flexible diaphragm mounted in said stator assembly with a fluid-tight seal and connected to said plunger with a fluid-tight seal, said diaphragm separating exhaust gases and lubricant on one side thereof from clean liquid lubricant on the other side thereof;
   a lubricant conduit extending through said stator assembly, said diaphragm on said plunger to convey liquid lubricant from a bath immersing a portion of said stator assembly to said pumping chamber;
   a sealing member; and
   bias means urging said plunger toward said sealing means with a predetermined force, said diaphragm opposing said bias force with a force dependent upon the pressure at said exhaust port, so that upon the occurrence of inadequate pumping action said plunger will be forced against said sealing member to preclude introduction of lubricant into said pumping chamber.

2. In a vacuum pump having a stator assembly enclosing a pumping chamber in communication with intake and exhaust ports, a lubricant control system for preventing the input of liquid lubricant to the pumping chamber of the vacuum pump if the vacuum pump is not pumping properly, while permitting the insertion of lubricant if the pump is operating properly, comprising:
   a reciprocable plunger mounted in said stator assembly;
   a flexible diaphragm mounted in said stator assembly with a fluid-tight seal and connected to said plunger with a fluid-tight seal, said diaphragm separating exhaust gases and lubricant on one side thereof from clean liquid lubricant on the other side thereof;
   a lubricant conduit extending through said stator assembly, said diaphragm and said plunger to convey liquid lubricant from a bath immersing a portion of said stator assembly to said pumping chamber;

a sealing member; and bias means urging said plunger toward said sealing means with a predetermined force, said diaphragm opposing said bias force with a force dependent upon the pressure at said exhaust port, so that upon the occurrence of inadequate pumping action said plunger will be forced against said sealing member to preclude introduction of lubricant into said pumping chamber.

3. A vacuum pump comprising:

a stator;

a rotor, said rotor being located in a pumping chamber in said stator;

a pair of end plates enclosing said pumping chamber, one of said end plates being an exhaust end plate;

an intake port and an exhaust port in communication with said pumping chamber, rotation of said rotor producing a pumping action that draws gases into said pumping chamber through said intake port and expels gases and lubricant through said exhaust port;

a bath of liquid lubricant partially immersing said stator and said end plates;

a lubricant inserting conduit formed in said exhaust end plate to introduce liquid lubricant into said pumping chamber of the vacuum pump;

a stem located in said lubricant inserting conduit;

an elastomeric sealing member positioned at one end of said stem, said sealing member spaced from the walls of said lubricant inserting conduit to permit passage of lubricant thereby;

a plunger mounted for reciprocable motion along said stem, the internal diameter of said plunger being spaced from said stem to permit passage of lubricant therebetween;

a cam portion formed on said plunger to bear against said sealing member and preclude the passage of lubricant between said plunger and said stem and over said sealing member, when said plunger is displaced toward the end of said stem on which said sealing member is positioned;

a bias spring urging said plunger toward said sealing member;

a cavity in said exhaust end plate connected to said exhaust port to reflect the pressure at said exhaust port; and an elastomeric diaphragm engaging said plunger and responsive to the pressure in said cavity, the force produced on said diaphragm by the pressure in said cavity opposing the force of said bias spring, said bias spring activating said plunger to cause said cam portion to bear against said sealing member when the pressure in said cavity falls below a predetermined value.

4. A vacuum pump as claimed in claim 3 and further comprising:

an exhaust conduit extending from said exhaust port through said exhaust end plate and being in communication with said cavity; and a leaf spring serving as a check valve in said exhaust conduit between said exhaust port and said cavity to prevent flow of lubricant from said cavity into said pumping chamber through said exhaust port, without interfering with the expelling of gases and lubricant through said exhaust port and said exhaust conduit.

5. A vacuum pump as claimed in claim 3 wherein said stem is held in position by said bias spring.

6. A vacuum pump as claimed in claim 3 wherein said stem comprises:

a threaded end portion on which a nut is mounted, said nut being engaged by bias spring to hold said stem in position; and a head portion which supports and positions said sealing member.

7. In a vacuum pump having a stator and rotor, the rotor being located in a pumping chamber enclosed by the stator and an end plate at each end of the stator, one of said end plates being an exhaust end plate, the pumping chamber having intake and exhaust ports in communication therewith and the stator and end plates being partially immersed in a bath of liquid lubricant, the rotor producing a pumping action upon rotation thereof to draw gases into the pumping chamber through the intake port and expelling gases and lubricant through the exhaust port, a lubricant control system for preventing the input of liquid lubricant to the pumping chamber if the vacuum pump is not pumping properly, while permitting the insertion of lubricant if the pump is operating properly, the control system being located in the exhaust end plate and comprising:

a lubricant inserting conduit formed in the exhaust end plate to introduce the liquid lubricant into the pumping chamber of the vacuum pump;

a stem located in said lubricant inserting conduit;

an elastomeric sealing member positioned at one end of said steam, said sealing member spaced from the walls of said lubricant inserting conduit to permit passage of lubricant thereby;

a plunger mounted for reciprocable motion along said stem, the internal diameter of said plunger being spaced from said stem to permit passage of lubricant therebetween;

a cam portion formed on said plunger to bear against said sealing member and preclude the passage of lubricant between said plunger and said stem and over said sealing member, when said plunger is displaced toward the end of said stem on which said sealing member is positioned;

a bias spring urging said plunger toward said sealing member;

a cavity in the exhaust end plate connected to the exhaust port to reflect the pressure at the exhaust port; and an elastomeric diaphragm engaging said plunger and responsive to the pressure in said cavity, the force produced on said diaphragm by the pressure in said cavity opposing the force of said bias spring, said bias spring activating said plunger to cause said cam portion to bear aginst said sealing member when the pressure in said cavity falls below a predetermined value.

8. A lubricant control system as claimed in claim 7 and further comprising:

an exhaust conduit extending from the exhaust port through the exhaust end plate and being in communication with said cavity; and a leaf spring serving as a check valve in said exhaust conduit between the exhaust port and said cavity to prevent flow of lubricant from said cavity into the pumping chamber through the exhaust port, without interfering with the expelling of gases and lubricant through the exhaust port and said exhaust conduit.

9. A vacuum pump as claimed in claim 7 wherein said stem is held in position by said bias spring.

10. A vacuum pump as claimed in claim 7 wherein said stem comprises:
a threaded end portion on which a nut is mounted, said nut being engaged by said bias spring to hold said stem in position; and
a head portion which supports and positions said sealing member.

* * * * *